(12) United States Patent
Wang et al.

(10) Patent No.: US 11,665,798 B2
(45) Date of Patent: May 30, 2023

(54) SYSTEM FOR CONTROLLING LAMP, CIRCADIAN LAMP AND HOLIDAY LAMP

(71) Applicant: SAVANT TECHNOLOGIES LLC, East Cleveland, OH (US)

(72) Inventors: Qingkai Wang, Shanghai (CN); Xurong Luo, Shanghai (CN); Yankun Gong, Shanghai (CN); Kun Xiao, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 17/395,407

(22) Filed: Aug. 5, 2021

(65) Prior Publication Data
US 2022/0141931 A1 May 5, 2022

(30) Foreign Application Priority Data
Oct. 30, 2020 (CN) .......................... 202022477494.6

(51) Int. Cl.
*H05B 45/20* (2020.01)
*H05B 47/19* (2020.01)
*H05B 47/155* (2020.01)
*H05B 45/10* (2020.01)
*F21Y 115/10* (2016.01)

(52) U.S. Cl.
CPC .............. *H05B 45/20* (2020.01); *H05B 45/10* (2020.01); *H05B 47/155* (2020.01); *H05B 47/19* (2020.01); *F21Y 2115/10* (2016.08)

(58) Field of Classification Search
CPC ...... H05B 45/20; H05B 47/19; H05B 47/155; H05B 45/10; F21Y 2115/10; F21V 14/00; F21V 23/00; F21V 23/003; F21V 23/0435; F21V 23/0442; F21V 99/00
See application file for complete search history.

(56) References Cited

U.S. PATENT DOCUMENTS

| | | | |
|---|---|---|---|
| 2010/0084996 A1* | 4/2010 | Van De Sluis | H05B 47/17 315/312 |
| 2016/0081166 A1* | 3/2016 | Eddins | H05B 47/19 315/294 |
| 2018/0288862 A1* | 10/2018 | Hasegawa | A61M 21/02 |
| 2020/0107420 A1* | 4/2020 | Ueno | H05B 47/16 |

* cited by examiner

*Primary Examiner* — Bao Q Truong
(74) *Attorney, Agent, or Firm* — Wood IP LLC

(57) ABSTRACT

The present application relates to a system for controlling a lamp, a circadian lamp and a holiday lamp. The system for controlling the lamp includes: a timing module, configured to acquire information about local time; and a lamp control module, configured to control the lamp to operate in a color temperature control mode, wherein in the color temperature control mode, the lamp control module provides, on the basis of the information about the local time, the lamp with a control signal, the control signal is used to adjust the color temperature and/or brightness of the lamp.

23 Claims, 3 Drawing Sheets

SYSTEM FOR CONTROLLING LAMP, CIRCADIAN LAMP AND HOLIDAY LAMP

TECHNICAL FIELD

The present application relates to the field of lamp control. Specifically, the present application relates to a system for controlling a lamp, a circadian lamp and a holiday lamp.

BACKGROUND

There are already many circadian lamps on the market. The circadian lamp may change illumination according to time.

However, the current circadian lamp must cooperate with an App to acquire the local time, therefore, it is expected to provide a system that may automatically acquire the local time without the App and control the lamp.

SUMMARY

An embodiment of the present application provides a system for controlling a lamp, a circadian lamp and a holiday lamp, as to at least solve a technical problem in the prior art that the lamp is difficult to be controlled according to time without App assistance.

According to an embodiment of the present application, a system for controlling a lamp is provided, including: a timing module, configured to acquire information about local time; and a lamp control module, configured to control the lamp to operate in a color temperature control mode, wherein in the color temperature control mode, the lamp control module provides, on the basis of the information about the local time, the lamp with a control signal, the control signal is used to adjust the color temperature and/or brightness of the lamp.

In this way, the color temperature and/or brightness of the lamp may be easily adjusted on the basis of the information about the local time.

According to an exemplary embodiment of the present application, the lamp control module includes: a correspondence data module, configured to acquire correspondence data between the local time and the color temperature and/or brightness, wherein the correspondence data represents correspondence between the local time and a color temperature and/or brightness at the local time.

In this way, how to adjust the color temperature and/or brightness of the lamp may be determined.

According to an exemplary embodiment of the present application, the correspondence data between the local time and the color temperature and/or brightness is data representing the correspondence of various time periods of a day and color temperatures and/or brightness of the sun.

In this way, the color temperatures and/or brightness of the sun shown in the various time periods of a day may be simulated by the lamp, which may comply with the circadian rhythm of human.

According to an exemplary embodiment of the present application, the information about the local time is acquired from time signal, and the time signal is a long wave signal provided by a long wave timing system, a satellite timing signal, a WIFI network signal, a 4G network signal or a 5G network signal.

In this way, the information about the local time may be acquired in various signal forms.

According to an exemplary embodiment of the present application, the timing module includes: an antenna module, configured to receive a time signal, wherein the time signal includes data representing the information about the local time; and a demodulation module, configured to demodulate the time signal to acquire the information about the local time.

In this way, the local time may be acquired by receiving the time signal transmitted by a base station.

According to an exemplary embodiment of the present application, the lamp control module further includes: a control signal generating module, configured to generate the control signal according to the local time and the correspondence, wherein the control signal causes the lamp to operate at a corresponding color temperature and/or brightness at the local time; and a signal transmission module, configured to transmit the control signal to the lamp.

In this way, the lamp may be controlled to generate the required color temperature and/or brightness at the specified time.

According to an exemplary embodiment of the present application, the system for controlling the lamp further includes an offline mode control module, the offline mode control module is configured to control the lamp to operate in a predetermined offline mode when no time signal is received.

In this way, the lamp may be operated according to the predetermined mode without the information about the local time.

According to an exemplary embodiment of the present application, in the offline mode, the lamp maintains the predetermined color temperature and/or brightness.

In this way, the lamp may be operated in the offline mode by the predetermined color temperature and/or brightness.

According to an exemplary embodiment of the present application, the antenna module is configured to continuously receive the time signal, and the system for controlling the lamp further includes a signal verification module, the signal verification module is configured to verify validity of the time signal; and the demodulation module is configured to only demodulate the time signal that is verified to be valid to acquire the information about the local time.

In this way, receiving accuracy may be improved, and high reliability of the information about the local time is guaranteed.

According to an exemplary embodiment of the present application, the system for controlling the lamp further includes a special mode control module, the special mode control module is configured to determine whether the local time corresponds to a predetermined date, and if the local time corresponds to the predetermined date, control the lamp to operate in a predetermined special mode.

In this way, a specific atmosphere may be built in the special date.

According to an exemplary embodiment of the present application, the predetermined date is a date of a holiday; and in the special mode, at least one of color temperature, brightness, color, illuminate direction, rhythm and flicker pattern of the lamp is changed according to a predetermined manner.

In this way, different showing effects of the lamp may be adjusted to provide the specific atmosphere of a holiday.

According to another aspect of an embodiment of the present application, a circadian lamp is further provided, including: a light source, wherein the light source may generate light with at least one color temperature and/or brightness; and a system for controlling the light source, the system includes a timing module, configured to acquire information about local time; and a lamp control module, configured to control the light source to operate in a color temperature control mode, herein in the color temperature control mode, the lamp control module provides, on the basis of the information about the local time, the light source with a control signal, the control signal is used to adjust the color temperature and/or brightness of the light source.

In this way, the color temperature and/or brightness of the circadian lamp may be easily adjusted on the basis of the information about the local time.

According to an exemplary embodiment of the present application, the lamp control module includes: a correspondence data module, configured to acquire correspondence data between the local time and the color temperature and/or brightness, wherein the correspondence data represents correspondence between the local time and a color temperature and/or brightness at the local time.

In this way, how to adjust the color temperature and/or brightness of the circadian lamp may be determined.

According to an exemplary embodiment of the present application, the correspondence data between the local time and the color temperature and/or brightness is data representing the correspondence of various time periods of a day and color temperatures and/or brightness of the sun.

In this way, the color temperatures of the sun shown in the various time periods of a day may be simulated by the circadian lamp, which may comply with the circadian rhythm of human.

According to an exemplary embodiment of the present application, the information about the local time is acquired from time signal, and the time signal is a long wave signal provided by a long wave timing system, a satellite timing signal, a WIFI network signal, a 4G network signal or a 5G network signal.

In this way, the information about the local time may be acquired in various signal forms.

According to an exemplary embodiment of the present application, the timing module includes: an antenna module, configured to receive a time signal, herein the time signal includes data representing the information about the local time; and a demodulation module, configured to demodulate the time signal to acquire the information about the local time.

In this way, the local time may be acquired by receiving the time signal transmitted by a base station.

According to an exemplary embodiment of the present application, the circadian lamp further includes a driving module, the driving module is configured to adjust the color temperature and/or brightness of the light source according to the control signal.

In this way, the light source may be controlled to be at different color temperatures and/or brightness.

According to an exemplary embodiment of the present application, the lamp control module further includes: a control signal generating module, configured to generate the control signal according to the local time and the correspondence, wherein the control signal causes the light source to operate at a corresponding color temperature and/or brightness at the local time; and a signal transmission module, configured to transmit the control signal to the light source.

In this way, the circadian lamp may be controlled to generate the required color temperature and/or brightness at the specified time.

According to an exemplary embodiment of the present application, the system for controlling the light source of the circadian lamp further includes an offline mode control module, the offline mode control module is configured to control the light source to operate in a predetermined offline mode when no time signal is received.

In this way, the circadian lamp may be operated according to the predetermined mode without the information about the local time.

According to an exemplary embodiment of the present application, in the offline mode, the light source maintains the predetermined color temperature and/or brightness.

In this way, the circadian lamp may be operated in the offline mode by the predetermined color temperature and/or brightness.

According to an exemplary embodiment of the present application, the antenna module is configured to continuously receive the time signal, and the system for controlling the light source of the circadian lamp further includes a signal verification module, the signal verification module is configured to verify validity of the time signal; and the demodulation module is configured to only demodulate the time signal that is verified to be valid to acquire the information about the local time.

In this way, receiving accuracy may be improved, and high reliability of the information about the local time is guaranteed.

According to an exemplary embodiment of the present application, the system for controlling the light source of the circadian lamp further includes a special mode control module, the special mode control module is configured to determine whether the local time corresponds to a predetermined date, and if the local time corresponds to the predetermined date, control the light source to operate in a predetermined special mode.

In this way, a specific atmosphere may be built in the special date.

According to an exemplary embodiment of the present application, the predetermined date is a date of a holiday; and in the special mode, at least one of color temperature, brightness, color, illuminate direction, rhythm and flicker pattern of the light source is changed according to a predetermined manner.

In this way, different showing effects of the circadian lamp may be adjusted to provide the specific atmosphere of a holiday.

According to another aspect of an embodiment of the present application, a holiday lamp is further provided, including: a light source, wherein the light source may generate light with at least one color; and a system for controlling the light source; the system includes a timing module, configured to acquire information about local time; and a lamp control module, configured to provide a control signal to the light source on the basis of the information about the local time, wherein the control signal is used to adjust at least one of color temperature, brightness, color, illuminate direction, rhythm and flicker pattern of the light source.

In this way, color temperature, the brightness, the color, the illuminate direction, the rhythm and the flicker pattern of the holiday lamp may be easily adjusted on the basis of the information about the local time.

According to an exemplary embodiment of the present application, the information about the local time is comprised by a long wave signal provided by a long wave timing system, a satellite timing signal, a WIFI network signal, a 4G network signal or a 5G network signal.

In this way, the information about the local time may be acquired in various signal forms.

According to an exemplary embodiment of the present application, the light source includes a near ultraviolet Light Emitting Diode (LED), a white LED, a red LED, a green LED and a blue LED.

In this way, the holiday lamp may generate colored light, and generate the required color according to a combination of various colors.

In the embodiment of the present application, the system for controlling the lamp, the circadian lamp and the holiday lamp that adjust the color temperature and/or brightness of the lamp through automatically acquiring the local time are provided, as to solve a technical problem that the lamp is difficult to be controlled according to the time without App assistance, a technical effect that the color temperature and/or brightness of the lamp is automatically adjusted according to the information about the local time without a manual configuration is achieved, and the circadian lamp or the holiday lamp with high reliability and high receiving sensitivity is provided.

BRIEF DESCRIPTION OF THE DRAWINGS

The drawings described here are adopted to provide further understanding to the present application and to form a part of the present application. Schematic embodiments of the present application and descriptions thereof are adopted to explain the present application and are not intended to form improper limits to the present application. In the drawings.

DESCRIPTIONS OF DRAWING REFERENCE SIGNS

100: System for controlling lamp;
101: Timing module;
103: Lamp control module;
1011: Antenna module;
1013: Demodulation module;
1031: Correspondence data module;
1033: Control signal generating module;
1035: Signal transmission module;
105: Offline mode control module;
107: Special mode control module;
109: Signal verification module;
200: Circadian lamp;
201, 301: Light source;
203: Driving module; and
300: Holiday lamp.

DETAILED DESCRIPTION OF THE EMBODIMENTS

In order to make those skilled in the art understand the solutions of the present application better, the technical solutions in the embodiments of the present application will be clearly and completely described below in combination with the drawings in the embodiments of the present application. It is apparent that the described embodiments are not all embodiments but only a part of the embodiments of the present application. All other embodiments obtained by those of ordinary skill in the art based on the embodiments in the present application without creative work shall fall within the scope of protection of the present application.

It is to be noted that the terms like "first" and "second" in the specification, claims and accompanying drawings of the present application are used for differentiating the similar objects, but do not have to describe a specific order or a sequence. It is to be understood that data used like this may be exchanged under a proper condition for implementation of the embodiments of the present application described here in sequences besides those shown or described herein. In addition, terms "include" and "have" and any transformation thereof are intended to cover nonexclusive inclusions. For example, a process, method, system, product or device including a series of steps or units is not limited to those clearly listed steps or modules or units, but may include other steps or modules or units which are not clearly listed or inherent in the process, the method, the system, the product or the device.

Figure 1:
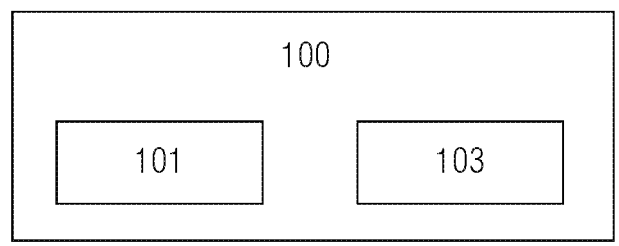
FIG. 1 is a schematic diagram of a system for controlling a lamp according to an embodiment of the present application.

According to an embodiment of the present application, a system for controlling a lamp is provided. FIG. 1 is a schematic diagram of a system for controlling a lamp according to an embodiment of the present application. As shown in FIG. 1, the system for controlling the lamp 100 includes: a timing module 101 and a lamp control module 103.

The timing module 101 is configured to acquire information about local time. The lamp control module 103 is configured to control the lamp to operate in a color temperature control mode, wherein in the color temperature control mode, the lamp control module 103 provides, on the basis of the information about the local time, the lamp with a control signal, the control signal is used to adjust the color temperature and/or brightness of the lamp. In this way, the color temperature and/or brightness of the lamp may be adjusted on the basis of the information about the local time.

Figure 2:
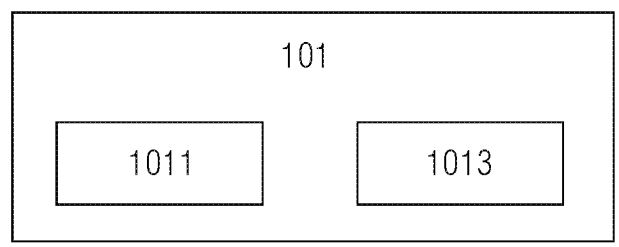
FIG. 2 is a schematic diagram of a timing module according to an embodiment of the present application.

FIG. 2 is a schematic diagram of a timing module according to an embodiment of the present application. As shown in FIG. 2, the timing module 101 includes an antenna module 1011 and a demodulation module 1013. The antenna module 1011 is configured to receive a time signal, and the time signal includes information representing local time. The demodulation module 1013 is configured to demodulate the time signal to acquire the information about the local time. According to an exemplary embodiment of the present application, the information about the local time is acquired from time signal, and the time signal is a long wave signal provided by a long wave timing system, a satellite timing signal, a WIFI network signal, a 4G network signal or a 5G network signal.

For example, the antenna module 1011 may be a long wave antenna module, and configured to receive a signal of 60 Hz, as to receive the time information provided by the long wave timing system. There are many advantages in a manner of long wave timing, for example, the method of long wave timing is free, and no patent grant is required, and a common channel is adopted, the coverage of the long wave signal is relatively wide, the intensity is stronger than the satellite signal, and the time accuracy is higher than the satellite signal. In addition, the antenna module 1011 may also be configured to receive various wireless network signals of other types, as to acquire the information about the local time.

Figure 3:
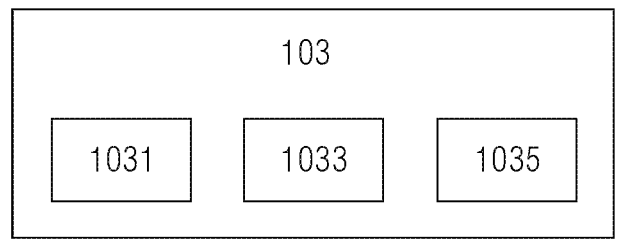
FIG. 3 is a schematic diagram of a lamp control module according to an exemplary embodiment of the present application.

FIG. 3 is a schematic diagram of a lamp control module according to an exemplary embodiment of the present application. As shown in FIG. 3, the lamp control module 103 according to the exemplary embodiment of the present application further includes a correspondence data module 1031, a control signal generating module 1033 and a signal transmission module 1035.

The correspondence data module 1031 is configured to acquire correspondence data between the local time and the color temperature and/or brightness, and the correspondence data represents correspondence between the local time and a color temperature and/or brightness at the local time. The control signal generating module 1033 is configured to generate the control signal according to the local time and the correspondence, and the control signal causes the lamp to operate at a corresponding color temperature and/or brightness at the local time. The signal transmission module 1035 is configured to transmit the control signal to the lamp. In this way, the lamp may be controlled to generate the required color temperature and/or brightness at the specified time. For example, the correspondence data between the local time and the color temperature and/or brightness may be provided according to a table, as to represent the correspondence between the local time and the color temperature and/or brightness at the local time. It should be understood that the correspondence data may also be provided in other suitable data forms.

Figure 4:
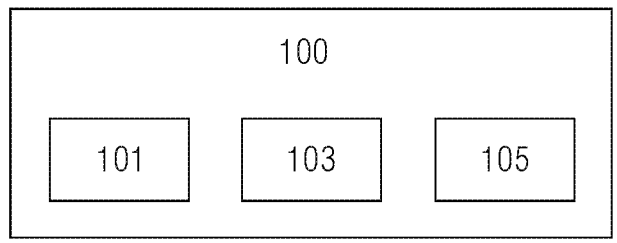
FIG. 4 is a schematic diagram of a system for controlling a lamp according to another exemplary embodiment of the present application.

FIG. 4 is a schematic diagram of a system for controlling a lamp according to another exemplary embodiment of the present application. As shown in FIG. 4, the system for controlling the lamp 100 according to the exemplary embodiment of the present application further includes an offline mode control module 105, the offline mode control module 105 is configured to control the lamp to operate in a predetermined offline mode when no time signal is received. For example, if the antenna module 1011 does not receive the time signal, the color temperature and/or brightness may not be adjusted according to the information about the local time. However, the system for controlling the lamp may be preconfigured so that it may be operated in an offline mode, in the offline mode, the system for controlling the lamp may control the lamp to operate in a predetermined mode. The predetermined color temperature and/or brightness may be maintained in the offline mode. For example, the lamp maintains a color temperature and/or brightness (default) in the offline mode, or maintains a certain color temperature and/or brightness according to the selection of the color temperature of the lamp by the user. In this way, the lamp may be operated according to the predetermined mode without the information about the local time.

Figure 5:
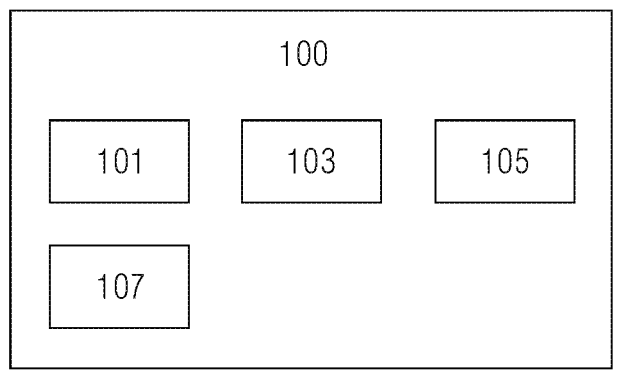
FIG. 5 is a schematic diagram of a system for controlling a lamp according to another exemplary embodiment of the present application.

FIG. 5 is a schematic diagram of a system for controlling a lamp according to another exemplary embodiment of the present application. As shown in FIG. 5, the system for controlling the lamp 100 according to the exemplary embodiment of the present application further includes a special mode control module 107, the special mode control module 107 is configured to determine whether the local time corresponds to a predetermined date, and if the local time corresponds to the predetermined date, control the lamp to operate in a predetermined special mode. For example, if it is determined that the predetermined date is a date of a holiday through the information about the local time, color temperature, brightness, color, illuminate direction, rhythm and/or flicker pattern and the like of the lamp may be controlled in the special mode so that it is matched with an atmosphere of the holiday, or a color temperature, a brightness, a color, change of the color temperature, the brightness, the color, illuminate direction, rhythm and/or flicker pattern that may make a user happy is shown. Color temperature refers to a cold color or a warm color of the light. Color refers to colors at different wavelengths, such as red, green, blue, white, etc., that present by the light. Rhythm refers to different contours, shapes, etc. that the light irradiated by the lamp presents, for example, the light may present a wavy or disc shape, or vary between different contours or shapes. Flicker refers to "turning on" and "turning off" of the lamp or "brighten" and "dimming" of the lamp, and flicker pattern refers to performing at least one of turning on, turning off, brighten the light and dimming the light according to a certain pattern so as to present the flicker of the light. The light may also be controlled to illuminate in different directions. It should be understood that the system for controlling the lamp may also control the lamp to show the color temperature, brightness, the color, illuminate direction, rhythm and/or flicker pattern expected by the user in a specified date or change the color temperature, the brightness, the color, the illuminate direction, the rhythm and/or the flicker pattern according to a specified rule. In this way, a holiday atmosphere may be built in the special date such as a holiday or a commemoration day.

Figure 6:
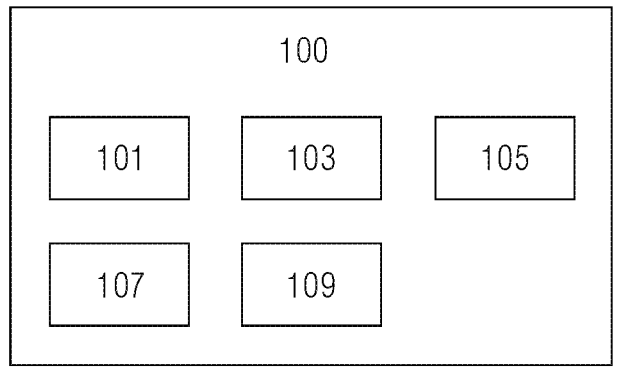
FIG. 6 is a schematic diagram of a system for controlling a lamp according to another exemplary embodiment of the present application.

FIG. 6 is a schematic diagram of a system for controlling a lamp according to another exemplary embodiment of the present application. As shown in FIG. 6, the system for controlling the lamp 100 according to the exemplary embodiment of the present application further includes a signal verification module 109.

The signal verification module 109 is configured to verify validity of the time signal. For example, the antenna module 1011 is configured to continuously receive the time signal. The antenna module 1011 is controlled to continuously receive several packets in allusion to the time signal so as to improve receiving accuracy, and the signal verification module 109 detects the accuracy of these packets. In one embodiment, a threshold of predetermined accuracy is set. The accuracy of the data in the packet of the time signal satisfies the threshold as a valid packet, and the packet with an accuracy lower than the threshold is discarded, so that only the valid packet is provided to the demodulation module 1013, and the demodulation module 1013 is configured to demodulate only the time signal verified to be valid to obtain the information about the local time. In a further embodiment, for example, a group comprising one or more data packet is set. For data in the group, if the number of the packets in which the accuracy of the data falls outside a standard deviation is more than a predetermined number, it is determined that the validity of the time signal is invalid, and the group of data packet is discard. If the number of the packets in which the accuracy of the data falls within the standard deviation is less than the predetermined number, it is determined that the validity of the time signal is valid. In this way, the receiving accuracy may be improved, and high reliability of the information about the local time is guaranteed.

In addition, according to an exemplary implementation mode of the present application, if the validity of the time signal within a certain period of time is invalid, the lamp may be controlled to enter the offline mode. At the same time, the antenna module 1011 may be continuously enabled to try to receive the time signal, and exit the offline mode when the validity of the time signal is valid, and the lamp is controlled again according to the information about the local time.

The system for controlling the lamp 100 according to the exemplary embodiment of the present application further includes a control enabling module (not shown in the figure), the control enabling module is configured to, when the validity of the time signal is verified to be valid, allow the lamp to operate in the color temperature control mode or the special mode. In this way, enabling control is performed on a function of the mode for controlling the lamp according to the information about the local time. When the system is operated in the color temperature control mode, the color temperature and/or brightness of the lamp may be correspondingly adjusted according to the time information. When the system is operated in the special mode, for example a holiday, the color of the lamp may be adjusted to build different holiday atmospheres.

The system for controlling the lamp 100 according to the exemplary embodiment of the present application further includes an alternating current/direct current conversion module (not shown in the figure), the alternating current/direct current conversion module is configured to receive alternating current power and perform alternating current/direct current conversion on the alternating current power to provide corresponding power to modules of the system 100. The alternating current power may be alternating current input power of the lamp, the alternating current/direct current conversion module, from the alternating current power, may acquire direct current power provided to each module. In an exemplary embodiment, the alternating current/direct current conversion module is configured to supply power to the lamp.

According to an exemplary embodiment of the present application, the correspondence data between the local time and the color temperature and/or brightness is data representing the correspondence of various time periods of a day and color temperatures and/or brightness of the sun. For example, the sun shows different color temperatures and/or brightness in various time periods of a day, and the correspondence of various time periods and color temperatures, the correspondence of various time periods and brightness, or the correspondence of various time periods and color temperatures and brightness may be reflected in the corresponding data. The system for controlling the lamp controls the lamp to be operated according to the correspondence, as to simulate the color temperatures and/or brightness of the sun in various time periods of a day to conform to circadian rhythm of human.

Figure 7:
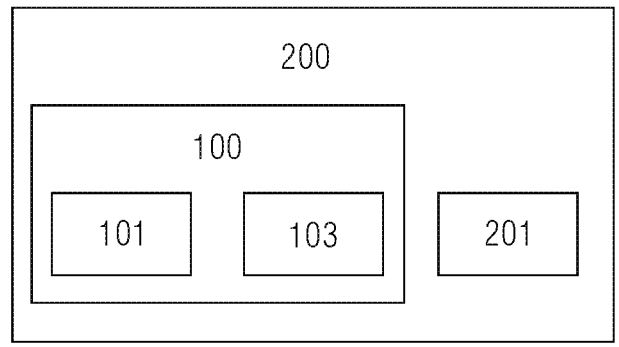
FIG. 7 is a schematic diagram of a circadian lamp according to an embodiment of the present application.

According to another aspect of an embodiment of the present application, a circadian lamp is further provided. FIG. 7 is a schematic diagram of a circadian lamp according to an embodiment of the present application. As shown in FIG. 7, the circadian lamp 200 includes a light source 201, and a system 100 for controlling the light source 201.

The light source 201 may generate light with different color temperatures. The system 100 for controlling the light source 201 includes: a timing module 101 and a lamp control module 103.

The timing module 101 is configured to acquire information about local time. The lamp control module 103 is configured to control the light source 201 to operate in a color temperature control mode, herein in the color temperature control mode, the lamp control module 103 provides, on the basis of the information about the local time, the light source 201 with a control signal, the control signal is used to adjust the color temperature and/or brightness of the light source 201. In this way, the circadian lamp may generate different color temperature and/or brightness of the light suitable for a human body over time.

According to an exemplary embodiment of the present application, the timing module 101 includes an antenna module 1011 and a demodulation module 1013. The antenna module 1011 is configured to receive a time signal, and the time signal includes information representing local time. Herein, the antenna module 1011 may be implemented by an antenna configured in the timing module 101. The demodulation module 1013 is configured to demodulate the time signal to acquire the information about the local time. The time signal received by the antenna module 1011 of the circadian lamp 200 is a long wave signal provided by a long wave timing system, a satellite timing signal, a WIFI network signal, a 4G network signal or a 5G network signal.

Figure 8:
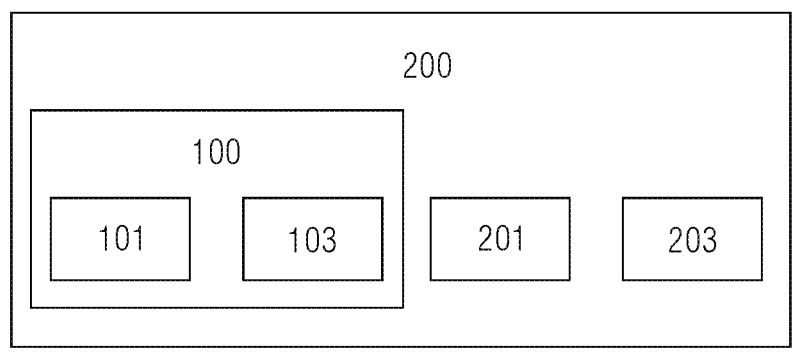
FIG. 8 is a schematic diagram of a circadian lamp according to another exemplary embodiment of the present application.

FIG. 8 is a schematic diagram of a circadian lamp according to another exemplary embodiment of the present application. As shown in FIG. 8, the circadian lamp 200 further includes a driving module 203.

The driving module 203 is configured to adjust the color temperature and/or brightness of the light source 201 according to the control signal. For example, the driving module 203 is configured to, on the basis of the received control signal, drive the light source 201, such that the light source 201 is adjusted to show different color temperatures and/or brightness according to the correspondence data between the local time and the color temperature and/or brightness (e.g. based on the change of color temperature and/or brightness of the sun) or different modes in which the light source 201 is operated. According to an exemplary embodiment of the present application, a function of the holiday lamp may also be provided, for example, when the date is a holiday, the light source 201 is driven to show different color temperatures, brightness, colors, illuminate directions, rhythms and flicker patterns and the like so as to create holiday atmospheres.

FIG. 7 and FIG. 8 show a circadian lamp according to an embodiment of the present application. The system for controlling a light source of the circadian lamp refers to the above system for controlling the lamp according to the embodiment of the present application, in which the configuration and function are the same, and are not repeatedly described here.

In addition, according to an exemplary embodiment of the present application, the alternating current/direct current conversion module of the system 100 for controlling the lamp is further configured to provide corresponding power to the light source 201.

Figure 9:
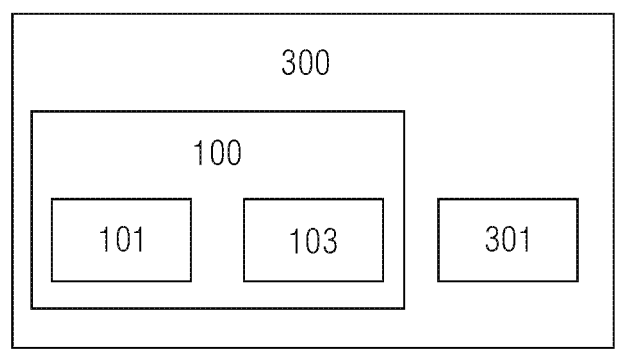
FIG. 9 is a schematic diagram of a holiday lamp according to an embodiment of the present application.

According to another aspect of an embodiment of the present application, a holiday lamp is further provided. FIG. 9 is a schematic diagram of a holiday lamp according to an embodiment of the present application. As shown in FIG. 9, the holiday lamp 300 includes a light source 301, and a system 100 for controlling the light source 301.

The light source 301 may generate light in different colors. The system 100 for controlling the light source 301 includes: a timing module 101 and a lamp control module 103.

The timing module 101 is configured to acquire information about local time. The lamp control module 103 is configured to provide a control signal to the light source 301 on the basis of the information about the local time, the control signal is used to adjust at least one of color temperature, brightness, color, illuminate direction, rhythm and flicker pattern of the light source 301. In this way, the holiday lamp provides light that creates desired atmosphere.

According to an exemplary embodiment of the present application, the information about the local time acquired by the timing module 101 of the holiday lamp 300 is comprised by a long wave signal provided by a long wave timing system, a satellite timing signal, a WIFI network signal, a 4G network signal or a 5G network signal.

According to an exemplary embodiment of the present application, the light source 301 includes at least one of a near ultraviolet LED, a white LED, a red LED, a green LED and a blue LED. The light source 301 generates different colors by controlling the LEDs in different colors of the light source 301.

In the embodiments of the present application, the descriptions of the embodiments focus on different aspects. The part which is not described in a certain embodiment in detail may refer to the related description of the other embodiments.

In some embodiments provided in the application, it is to be understood that the disclosed technical contents may be implemented in other manners. Herein, the device embodiment described above is only schematic. For example, division of the units or modules is only division of logical functions, and other division manners may be adopted during practical implementation. For example, multiple units or modules or components may be combined or integrated to another system, or some features may be ignored or are not executed. In addition, shown or discussed coupling, direct coupling or communication connection may be implemented through indirect coupling or communication connection of some interfaces, modules or units, and may be in an electrical form or other forms.

The units or modules described as separate parts may or may not be separate physically, and parts displayed as units or modules may or may not be physical units or modules, that is, they may be located in the same place, or may also be distributed to multiple network units or modules. Part or all of the units or modules may be selected to achieve the purpose of the solutions of the embodiments according to a practical requirement.

In addition, each functional unit or module in each embodiment of the present application may be integrated into a processing unit or module, each unit or module may also physically exist independently, and two or more than two units or modules may also be integrated into a unit or module. The integrated unit or module may be implemented in a hardware form and may also be implemented in form of software functional unit or module.

If being implemented in form of software functional unit and sold or used as an independent product, the integrated unit may be stored in a computer-readable storage medium. Based on such an understanding, the technical solutions of the present application substantially or parts making contributions to the conventional art or all or part of the technical solutions may be embodied in form of software product. The computer software product is stored in a storage medium, including a plurality of instructions configured to enable a computer device (which may be a PC, a server, a network device or the like) to execute all or part of the steps of the method in each embodiment of the present application. The storage medium includes various media capable of storing program codes such as a U disk, a Read-Only Memory (ROM), a Random Access Memory (RAM), a mobile hard disk, a magnetic disk or a compact disc.

The above is only the preferred embodiment of the present application. It is to be pointed out that those of ordinary skill in the art may also make a number of improvements and embellishments without departing from the principle of the present application and these improvements and embellishments shall also fall within the scope of protection of the present application.

What is claimed is:

1. A system for controlling a lamp, comprising:
   a timing module, configured to acquire information about local time; and
   a lamp control module, configured to control the lamp to operate in a color temperature control mode,
   wherein in the color temperature control mode, the lamp control module provides, on the basis of the information about the local time, the lamp with a control signal, the control signal is used to adjust the color temperature and/or brightness of the lamp, and
   wherein the information about the local time is acquired from a time signal, and the time signal is a long wave signal provided by a long wave timing system, a satellite timing signal, a WIFI network signal, a 4G network signal or a 5G network signal.

2. The system as claimed in claim 1, wherein the lamp control module comprises:
   a correspondence data module, configured to acquire correspondence data between the local time and the color temperature and/or brightness, wherein the correspondence data represents correspondence between the local time and a color temperature and/or brightness at the local time.

3. The system as claimed in claim 2, wherein:
   the correspondence data between the local time and the color temperature and/or brightness is data representing the correspondence of various time periods of a day and color temperatures and/or brightness of the sun.

4. The system as claimed in claim 1, wherein the timing module comprises:
   an antenna module, configured to receive a time signal, wherein the time signal comprises data representing the information about the local time; and
   a demodulation module, configured to demodulate the time signal to acquire the information about the local time.

5. The system as claimed in claim 2, wherein the lamp control module further comprises:
   a control signal generating module, configured to generate the control signal according to the local time and the correspondence, wherein the control signal causes the lamp to operate at a corresponding color temperature and/or brightness at the local time; and
   a signal transmission module, configured to transmit the control signal to the lamp.

6. The system as claimed in claim 4, wherein the system further comprises:
   an offline mode control module, configured to control the lamp to operate in a predetermined offline mode when no time signal is received.

7. The system as claimed in claim 6, wherein:
in the offline mode, the lamp maintains the predetermined color temperature and/or brightness.

8. The system as claimed in claim 4, wherein the antenna module is configured to continuously receive the time signal, and the system further comprises:
a signal verification module, configured to verify validity of the time signal; and
the demodulation module is configured to only demodulate the time signal that is verified to be valid to acquire the information about the local time.

9. The system as claimed in claim 1, wherein the system further comprises:
a special mode control module, configured to determine whether the local time corresponds to a predetermined date, and if the local time corresponds to the predetermined date, control the lamp to operate in a predetermined special mode.

10. The system as claimed in claim 9, wherein:
the predetermined date is a date of a holiday; and
in the special mode, at least one of color temperature, brightness, color, illuminate direction, rhythm and flicker pattern of the lamp is changed according to a predetermined manner.

11. A circadian lamp, comprising:
a light source, wherein the light source can generate light with at least one color temperature and/or brightness; and
a system for controlling the light source;
the system comprises:
a timing module, configured to acquire information about local time; and
a lamp control module, configured to control the light source to operate in a color temperature control mode, wherein in the color temperature control mode, the lamp control module provides, on the basis of the information about the local time, the light source with a control signal, the control signal is used to adjust the color temperature and/or brightness of the light source, and
wherein the information about the local time is acquired from a time signal, and the time signal is a long wave signal provided by a long wave timing system, a satellite timing signal, a WIFI network signal, a 4G network signal or a 5G network signal.

12. The circadian lamp as claimed in claim 11, wherein the lamp control module comprises:
a correspondence data module, configured to acquire correspondence data between the local time and the color temperature and/or brightness, wherein the correspondence data represents correspondence between the local time and a color temperature and/or brightness at the local time.

13. The circadian lamp as claimed in claim 12, wherein:
the correspondence data between the local time and the color temperature and/or brightness is data representing the correspondence of various time periods of a day and color temperatures and/or brightness of the sun.

14. The circadian lamp as claimed in claim 11, wherein the timing module comprises:
an antenna module, configured to receive a time signal, wherein the time signal comprises data representing the information about the local time; and
a demodulation module, configured to demodulate the time signal to acquire the information about the local time.

15. The circadian lamp as claimed in claim 11, wherein the circadian lamp further comprises:
a driving module, configured to adjust the color temperature and/or brightness of the light source according to the control signal.

16. The circadian lamp as claimed in claim 12, wherein the lamp control module further comprises:
a control signal generating module, configured to generate the control signal according to the local time and the correspondence, wherein the control signal causes the light source to operate at a corresponding color temperature and/or brightness at the local time; and
a signal transmission module, configured to transmit the control signal to the light source.

17. The circadian lamp as claimed in claim 14, wherein the system for controlling the light source further comprises:
an offline mode control module, configured to control the light source to operate in a predetermined offline mode when no time signal is received.

18. The circadian lamp as claimed in claim 17, wherein:
in the offline mode, the light source maintains the predetermined color temperature and/or brightness.

19. The circadian lamp as claimed in claim 14, wherein the antenna module is configured to continuously receive the time signal, and the system further comprises:
a signal verification module, configured to verify validity of the time signal; and
the demodulation module is configured to only demodulate the time signal that is verified to be valid to acquire the information about the local time.

20. The circadian lamp as claimed in claim 11, wherein the system for controlling the light source further comprises:
a special mode control module, configured to determine whether the local time corresponds to a predetermined date, and if the local time corresponds to the predetermined date, control the light source to operate in a predetermined special mode.

21. The circadian lamp as claimed in claim 20, wherein:
the predetermined date is a date of a holiday; and
in the special mode, at least one of color temperature, brightness, color, illuminate direction, rhythm and flicker pattern of the light source is changed according to a predetermined manner.

22. A holiday lamp, comprising:
a light source, wherein the light source can generate light with at least one color; and
a system for controlling the light source;
the system comprises:
a timing module, configured to acquire information about local time; and
a lamp control module, configured to provide a control signal to the light source on the basis of the information about the local time,
wherein the control signal is used to adjust at least one of color temperature, brightness, color, illuminate direction, rhythm and flicker pattern of the light source, and
wherein the information about the local time is included in a long wave signal provided by a long wave timing system, a satellite timing signal, a WIFI network signal, a 4G network signal or a 5G network signal.

23. The holiday lamp as claimed in claim 22, wherein the light source comprises:
at least one of a near ultraviolet Light Emitting Diode (LED), a white LED, a red LED, a green LED and a blue LED.

* * * * *